Aug. 10, 1943.  H. W. HAPMAN  2,326,535
CONVEYER
Filed Jan. 25, 1941  2 Sheets-Sheet 2
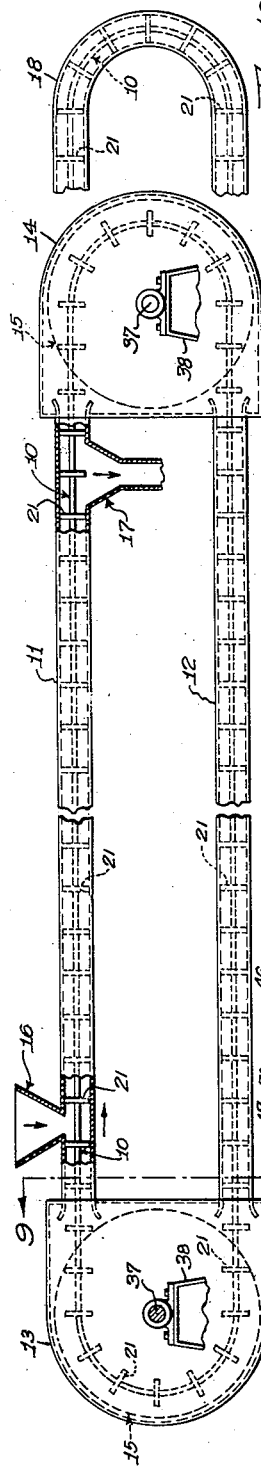
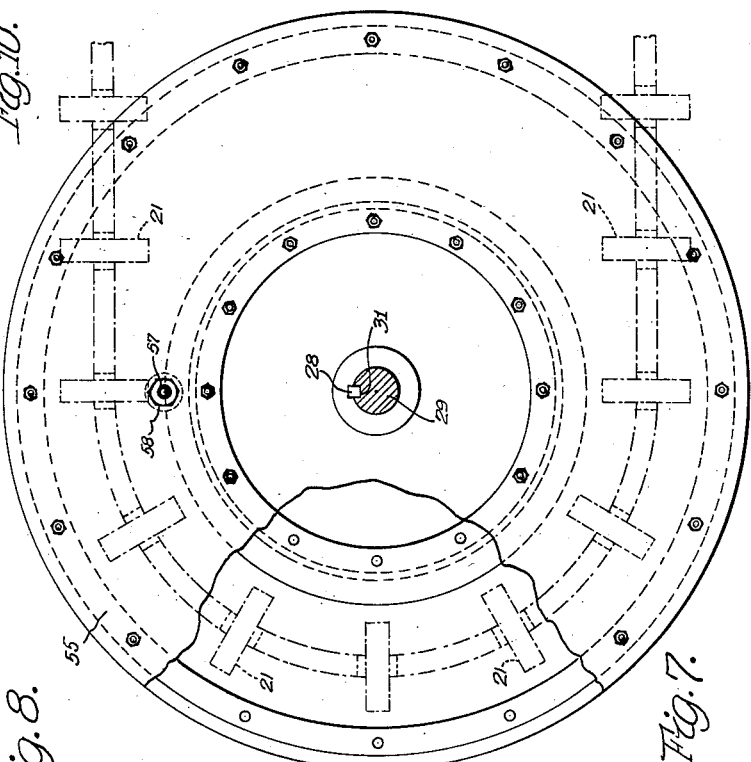
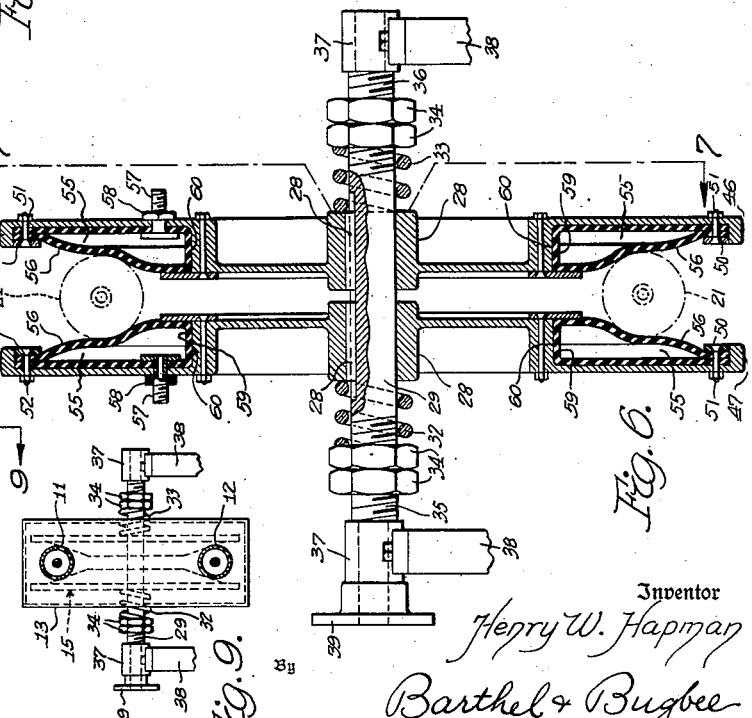
Inventor
Henry W. Hapman
By
Barthel & Bugbee
Attorneys Patented Aug. 10, 1943

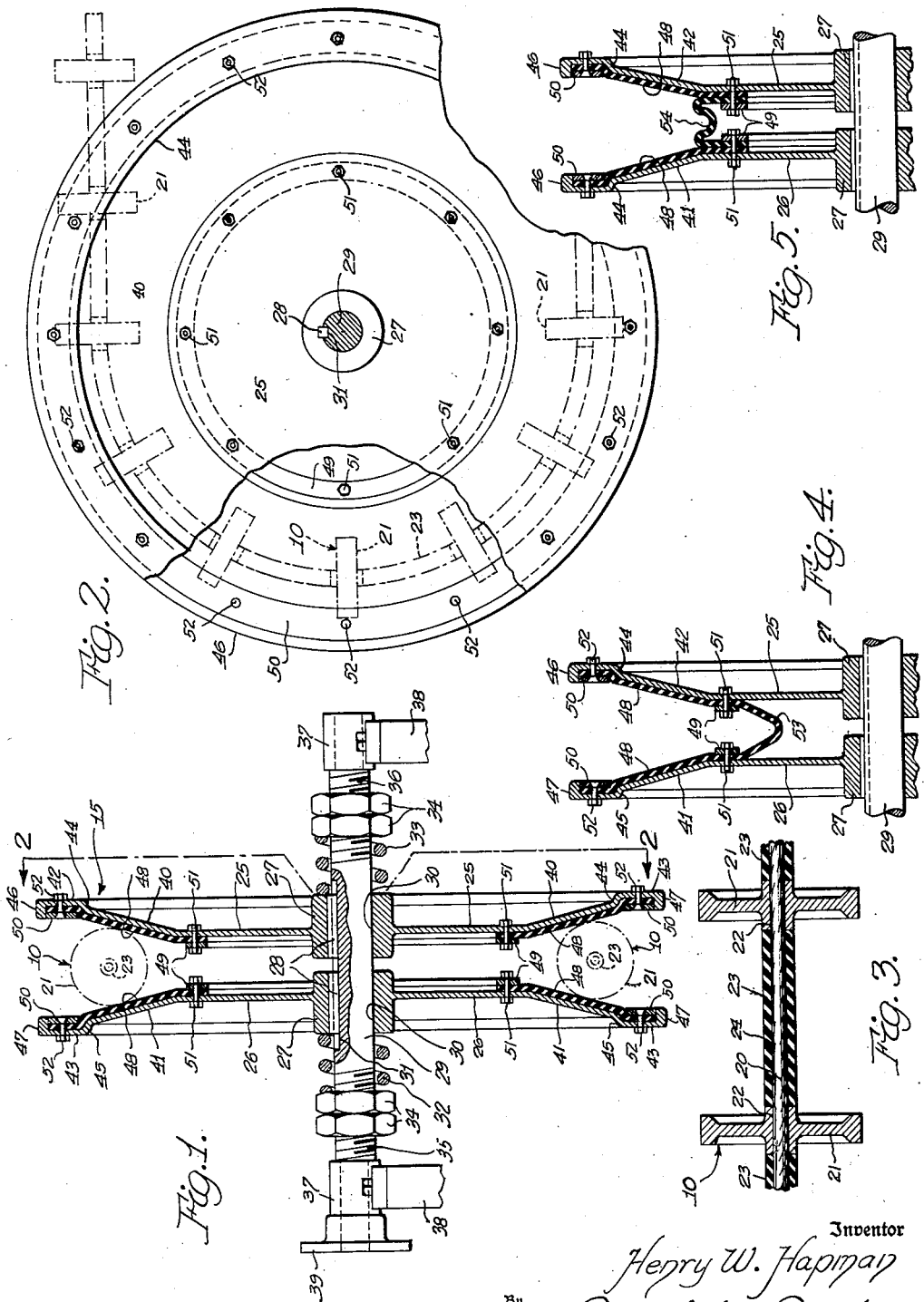

2,326,535

UNITED STATES PATENT OFFICE 2,326,535

CONVEYER

Henry W. Hapman, Detroit, Mich.

Application January 25, 1941, Serial No. 375,945

14 Claims. (Cl. 198—203)

This invention relates to conveyers and processes of making conveyers.

One object of this invention is to provide a conveyer for transporting comminuted or granular material wherein the conveyer is free from sprockets and sprocket chains and has automatic compensation for wear or weather changes.

Another object is to provide a conveyer having an endless flexible connector with flights spaced therealong and supported at one or more locations by a pulley of special characteristics, this pulley having disks lined with a rubber-like material for gripping and driving the flights of the conveyer.

Another object is to provide a conveyer having an endless flexible connector with spaced flights thereon operating in a conduit and supported by one or more pulleys consisting of paired disks with oppositely inclined peripheries lined with a rubber-like material for gripping and driving the conveyer flights, the pulley disks being resiliently mounted to move axially so as to apply a predetermined gripping force to the conveyer flights and at the same time automatically compensate for wear or lengthening of the flexible connector.

Another object is to provide a conveyer as set forth in the preceding objects wherein the inner portions of the two pulley disks are interconnected by an annular flexible member capable of permitting the pulley disks to separate axially, yet preventing the contents of the conveyer from reaching the pulley shaft or hub.

Another object is to provide a conveyer as set forth in the preceding objects wherein the outer edges of the rubber-like pulley linings are protected by inwardly flanged portions on the pulley disk peripheries.

Another object is to provide a conveyer as set forth in the preceding objects wherein the conveyer is supported at one end by a U-shaped conduit instead of a pulley.

Another object is to provide a conveyer as set forth in the preceding objects wherein the conveyer pulley consists of a pair of separable disks having annular inflatable members of rubber-like material at the peripheries thereof and arranged to yieldingly grip the conveyer flights so as to apply an even pressure and compensate for wear or slackening of the conveyer.

Another object is to provide a conveyer having an endless flexible connector with transverse flights spaced therealong and separated by tubular spacers, preferably of rubber-like material and serving to prevent contact between the flexible connector and the material being conveyed.

Another object is to provide a process of making a conveyer consisting in alternately mounting or "stringing" flights and spacers of resilient material upon a flexible connector, and compressing the spacers longitudinally during assembly so that as the flexible connector slackens or lengthens during its operating life, the compressed spacers will merely expand and continue to completely fill the space between the adjacent conveyer flights.

Another object is to provide a conveyer consisting of an endless flexible connector with spaced disk-like flights mounted thereon and running in one or more tubular conduits, the flights being of chemical-resisting material and separated by tubular spacers of chemical-resisting material completely covering the flexible connector, so that chemicals or abrasive materials may be conveyed without injury to or deterioration of the conveyer.

In the drawings:

Figure 1 is an axial section through a conveyer and supporting pulley of a preferred form according to the present invention.

Figure 2 is a cross-section along the line 2—2 in Figure 1 with one of the pulley disks partly broken away to disclose the interior construction.

Figure 3 is a longitudinal section through a portion of the flexible connector and a pair of conveyer flights separated by a tubular spacer.

Figure 4 is a view similar to the upper portion of Figure 1 but showing a modification wherein the pulley disks are interconnected by an annular flexible member for preventing the conveyed materials from reaching the hub portions of the pulley.

Figure 5 is a view similar to Figure 4 but showing another modification having the same purpose.

Figure 6 is a view similar to Figure 1 but showing a further modification wherein the conveyer flights are supported and gripped by annular inflatable members mounted on the pulley disks.

Figure 7 is a cross-section along the line 7—7 of Figure 6, partly broken away to show the interior construction.

Figure 8 is a side elevation, partly in section, of a complete conveyer according to the present invention.

Figure 9 is a cross section along the line 9—9 in Figure 8.

Figure 10 is a side elevation of a modification of Figure 8 wherein a U-shaped conduit is used to support one portion of the conveyer mechanism instead of a pulley.

General arrangement

In general, the conveyer of this invention consists of a flexible connector, such as a flexible cable or chain carrying spaced disk-like flights with tubular spacers therebetween. The tubular spacers are preferably of rubber-like material, such as natural or synthetic rubber or synthetic resin and are preferably assembled in a compressed condition so that as the flexible connector stretches during its working life, the tubular spacers automatically elongate and continue to fill the spaces between the flights. In this manner, the flexible connector is completely covered and protected from action by the material being conveyed, whereas the latter is protected from contamination by particles from the flexible conveyer.

The travelling portion of the conveyer consisting of the flexible connector with its spaced flights and spacers is mounted at one or both ends of its course upon pulleys lined with rubber-like material such as natural or synthetic rubber or synthetic resin. The pulleys preferably consist of axially movable disks having opposed conical portions at their peripheries for receiving the rubber-like liners which engage the conveyer flights. The lining is protected at the outer periphery by flanged portions on the pulleys. The pulley disks are preferably keyed to the shaft and movable therealong but urged toward one another by resilient means, such as one or more coil springs. In this manner, the travelling portion of the conveyer is gripped at the end of its course between the rubber-like liners.

In the modification of the invention shown in Figures 4 and 5, the pulley disks are interconnected by annular flexible members of the same material as the rubber-like liners, so as to prevent the material being conveyed from reaching the shaft or hub portions of the pulley. In the modification shown in Figures 6 and 7, the liners comprise inflatable annular members resembling annular tubes capable of receiving compressed air or other compressed gas so that a predetermined pressure can be applied to the liners to engage the conveyer flights in a partially encircling grip. One or more ends or intermediate portions of the conveyer may be supported by a U-shaped or otherwise bent conduit such as the modified construction shown in Figure 10. This construction replaces the pulley otherwise used to support that portion of the conveyer.

Hitherto, conveyers using endless flexible members have consisted ordinarily of sprocket chains carrying the conveyer flights and supported upon sprockets. In such conveyers, the load is concentrated upon the sprocket teeth and especially upon the first tooth being engaged by the conveyer chain as it moves onto the sprocket. For this reason, the sprocket chain wears rapidly and is subject to a high upkeep cost. The sprocket chain is also very delicate in the presence of abrasive or corrosive materials and its links wear rapidly at their pivots under such conditions.

In the conveyer of the present invention, however, the load is distributed between all of the flights of the conveyer which are engaging the driving pulley disks. Furthermore, there are no pivots, rollers or sprocket teeth to be injured or worn and the flexible connector, which is preferably a stranded metal cable, is easily protected from contact with the materials being conveyed, and vice versa.

Flexible cables are subject to a large amount of stretching when they are first put into use. In a conveyer employing such flexible cables, therefore, provision must be made for the take-up of this stretching. Ordinarily, it is necessary to provide movable bearing blocks or adjustable blocks for the pulley shafts so that the endless cable may be tightened and the slack taken up. In the conveyer of the present invention, however, the pulleys automatically take up this stretching of the cable without requiring the attention of the operator. When the cable is first put in operation, it is adjusted so that it follows a path relatively far down in the groove between the pulley disks. As the cable stretches, however, the flights on the cable are pushed outward and engage portions of the pulley disks nearer the peripheries thereof. The coil springs or other resilient members urge the pulley disks toward each other to bring about this automatic compensation for the stretching of the conveyer cable.

Flexible conveyer construction and process

Referring to the drawings in detail, Figures 1 to 3 and 8 show the conveyer of this invention as consisting of an endless conveyer assembly generally designed 10 (Figure 3), a pair of relatively straight conduits or pipes 11 and 12, and a pair of end housings 13 and 14 containing the pulleys generally designated 15. The straight conduit 11 is provided with an inlet hopper 16 and a discharge conduit 17 at opposite ends thereof. The system shown in Figure 8 is a simplified system fulfilling the minimum requirements of a conveyer of this type, frequently known as a pipe conveyer. It will be obvious, however, that where a conveyer is partly horizontal and partly vertical or inclined, other pulleys or bent conduits may be provided at intermediate points in order to properly support the conveyer. One or more of the pulleys may be used as the driving pulley and the other pulleys as loose or free pulleys. The loose or free pulleys may be replaced by the modification of Figure 10, consisting of a U-shaped bent conduit 18 adapted to replace one of the end housings 13 or 14 and one of the pulleys 15. The bent conduit 18 may be used where the materials being conveyed do not constitute too heavy a load upon the conveyer. Where heavy or extremely abrasive materials are being conveyed, however, it is preferable to use supporting pulleys rather than bent conduits, and to drive two or more of the pulleys.

The travelling conveyer unit 10 (Figure 3) consists of a flexible connector 20, such as a flexible stranded metal cable. This is arranged in an endless path, and the opposite ends are joined by any suitable coupling or splicing (not shown). Mounted at spaced intervals along the flexible connector 20 are the disk-like conveyer flights 21 having bores 22 through which the flexible connector 20 passes. The flights 21 may be of noncorrosive material, such as hard rubber, synthetic resin or the like when corrosive chemicals are to be conveyed. Optionally, the conveyer flights 21 may consist of metal covered by synthetic or natural rubber or synthetic resin where greater strength is required.

The spaced conveyer flights 21 are separated from one another by tubular spacers 23 having internal bores 24 through which the flexible connector or cable 20 passes. The spacers 23 are preferably of rubber-like material, such as natural or synthetic rubber or synthetic resin, so that they are flexible and resilient, as well as being compressible.

The process of making the conveyer unit 10 enables the unit to be self-compensating for stretch. Tests show that flexible metal cable stretches very rapidly during the first part of its working life, after which very little stretch occurs until the cable is approaching the end of its working life. When the strands of the cable begin to break after a long life, the cable stretches rapidly and failure occurs.

The process of making the conveyer according to the present invention compensates automatically for this stretch of the cable and prevents portions thereof from being uncovered during operation. It includes compressing the resilient spacers 23 longitudinally while mounting them alternately with the conveyer flights or disks 21 upon the flexible connector 20. The final flight 21 is installed temporarily without its spacer 23 but at a separation from the preceding flight 21 which is somewhat less than the length of the spacer 23. The free ends the flexible connector 20 are spliced or otherwise joined together and the final spacer 23 is then split longitudinally and forced over the flexible connector 20 into this short space, thereby being compressed longitudinally. The split spacer 23 is then preferably cemented and wrapped with a tape cover. Thus, when the cable or flexible connector 20 stretches, the compressed rubber-like spacers 23 expand longitudinally with the stretching of the cable 20 and continue to cover it completely. The tubular spacers 23 are preferably cemented to the flexible connector 20. In this manner, the chemicals or other materials being conveyed are prevented from reaching the flexible connector 20 and particles of the latter are also prevented from chipping off and contaminating the materials being conveyed.

The spacers 23 may be of unequal lengths and the flights 21 unevenly spaced along the flexible connector 20, if desired, for the variably spaced flights will still be satisfactorily driven by the pulleys 15. In the sprocket type of conveyer, however, the flights must be evenly spaced.

*Pulley construction*

The pulleys 15 (Figures 1 and 2) which support the flexible conveyer unit 10, consist of pulley disks or pulley halves 25 and 26 having hubs 27 splined as at 28 to the shaft 29 and having bores 30 for the passage of the shaft, which is provided with a keyway 31 for receiving the keys 28. Coil springs 32 and 33 engage the hubs 27 and urge the pulley disks 25 and 26 toward one another along the shaft 29. The springs 32 and 33 abut nuts 34 mounted upon the threaded portions 35 and 36 of the shaft 29. One of the nuts 34 serves as an adjusting nut and the other as a lock nut, whereby the tension of the springs 32 and 33 may be adjusted.

The pulley shaft 29 is journaled in bearings 37 mounted upon supports 38. One end of the shaft 29 carries a coupling 39 of any suitable type for drivingly connecting the pulley shaft 29 to a source of power. The pulley disks 25 and 26 are provided with oppositely flared conical portions 40 and 41 terminating peripherally in radial flanges 42 and 43 with bent portions 44 and 45 connecting them with the conical or flared portions 40 or 41. The radially flanged portions 42 terminate in transversely flanged portions 46 and 47. Secured to the inner surfaces of the flared portions 40 and 41 are liners 48 of rubber or rubber-like material, such as natural or synthetic rubber or synthetic resin. The liners 48 are of annular shape and are secured to the pulley halves by the inner and outer securing rings 49 and 50. These are bolted as at 51 and 52 respectively to the pulley disks. The outer edges of the liners 48 are covered by the transverse or axial flanges 47 which also cover the outer securing rings 50. In this manner any materials or the travelling portion 10 itself falling upon the pulley will not injure the edges of the liners 48. The flanges 47 also serve to guide the conveyer unit 10 into the groove-like space between the liners 48. The liners 48, being of rubber or rubber-like material, engage the conveyer flights 21 with a firm grip and cause the driving force to be transmitted from the pulley disks 25 and 26 to the conveyer unit 10.

The modification shown in Figure 4 is similar to that shown in Figure 1 except that the inner edges of the liners 48 are interconnected by a flexible portion 53. This flexible portion 53 may be integral with and form a part of the two liners 48 or it may be separate therefrom. This flexible portion 53 extends around the hub portions 27 of the pulley halves or disks 25 or 26 and protects them and the shaft 29 from particles of the material being conveyed.

The modification shown in Figure 5 is similar to that shown in Figure 4, and is for the same purpose. The pulley liners 48 of Figure 5 are interconnected at their inner edges by a flexible member 54 which is separate from the liners 48 or intgeral therewith. The bottom of the flexible portion 54 in Figure 5, however, is farther from the shaft 29 than the flexible portion 53 of Figure 4 and is on the side toward the periphery of the pulley.

The modification shown in Figures 6 and 7 includes inflatable hollow liners 55 of annular shape and having contact portions 56 facing one another and engageable with the conveyer flights 21. The hollow liners 55 are provided with hollow flanged nipples 57 equipped with proper valves and secured thereto by the nuts 58. By applying a source of compressed air to the nipples 57, the hollow liners 55 may be inflated to any desired pressure. This pressure can be adapted to the needs of the particular conveying conditions. The inflatable liners 55 enable the portions 56 thereof to partially encircle the conveyer flights 21, thereby giving a more firm grip thereon and providing a greater driving engagement. The inflatable liners 55 are supported at their inner axially-extending flanged portions 59 having inner walls 60 engageable with the hollow liners 55.

*Operation*

In the operation of the conveyer of this invention, one or more of the pulleys 15 is driven by applying power to the shaft 29, whereupon the frictional engagement between the liners 48 or 55 and the conveyer flights 21 causes the latter to travel in an endless orbital path, likewise moving the flexible connector 20 and tubular spacers 24 in this orbital path. As the cable or other flexible connector 20 stretches, the conveyer flights 21 are merely urged outwardly between the flared portions 40 and 41 of the pulley disks 25 and 26 by the action of the coil springs 32 and 33. This action automatically compensates for the stretch of the flexible connector 21 and requires no attention upon the part of the operator. Temporary changes causing expansion or contraction of the conveyer are also automatically taken care of in this manner. The conveyer flights 21 engage the spacers 48 at different points during different revolutions so that the wear is evenly distributed. This is a great advantage over the sprocket type of conveyer, wherein the wear of the conveyer is concentrated at the sprocket teeth and the rollers or other contacting portions of the sprocket chain.

A clearance is preferably left between the conveyer flights 21 and the conduits 11 and 12. Where grain and very finely divided substances are being conveyed, however, a substantially full contact and close fit can be employed between the conveyer flights 21 and the conduits 11 and 12. This clearance is preferably slightly greater than the maximum diameter of the particle being handled by the conveyer so as to prevent jamming of the particles and enable them to be easily dropped into the spaces between the conveyer flights 21. This is especially important when lumps of material are being conveyed, such as lumps of coal, grain or gravel. As previously stated, since the tubular spacers 23 are in a state of compression when the conveyer is assembled, they also expand as the flexible connector 20 stretches, thereby preventing uncovering of any portion of the latter.

The conveyer system of the present invention is also very resilient in its operation due to the fact that the conveyer flights engage rubber or rubber-like material. This rubber-like material of the liners 48 also absorbs vibration and lengthens the life of the installation. This is also in contrast to the sprocket types of conveyers previously used, which are noisy and of short life.

The operation of the modifications in Figures 4 and 5 are similar to that of Figure 1 with the exception that the material being conveyed falls into the flexible connecting portions 53 or 54. This prevents the material from reaching the shaft 29 or the hub portions 27 of the pulley halves 25 and 26.

The operation of the conveyer employing inflatable liners (Figure 9) is likewise similar to that of Figure 1 except that a greater area of the conveyer flight 21 is engaged and consequently a greater driving effort is applied thereto. The inflatable conveyer also enables a varying and controllable grip to be applied to the conveyer flights 21, as well as cushioning the latter more completely. This action still further absorbs vibration and still further reduces the noise of the installation.

While a specific embodiment of the invention has been described and illustrated, it will be understood that various modifications may be made within the scope of the appended claims without departing from the spirit of the invention.

What I claim is:

1. In a conveyer system, conveyer supporting and driving means including a pulley having a relatively deep groove with rubber-like lining means in the groove thereof, a conveyer conduit, and an endless conveyer having closely spaced flights extending through said conduit and mounted in said pulley groove with the flights of the conveyer having substantially diametrically opposed portions in engagement with said lining means whereby a plurality of flights will be in driving contactual engagement with said lining means during a portion of its arcuate travel.

2. In a conveyer system, conveyer supporting and driving means including a pulley having a relatively deep groove with rubber-like lining means in the groove thereof, a conveyer conduit, and an endless conveyer having closely spaced flights extending through said conduit and mounted in said pulley groove with the flights having opposed portions in engagement with said lining means whereby a plurality of flights will be in driving contactual engagement with said lining means during a portion of arcuate travel of the conveyer, said pulley having one half thereof movable axially relatively to the other pulley half.

3. In a conveyer system, conveyer supporting and driving means including a pair of movable pulley disks providing a pulley having a relatively deep groove with rubber-like lining means in the groove thereof, a conveyer conduit, and an endless conveyer having closely spaced flights extending through said conduit and mounted in said pulley groove with the edges of the flights on opposite sides thereof in engagement with said lining means whereby a plurality of flights will be in driving contactual engagement with said lining means during a portion of arcuate travel of the conveyer, said pulley having one half thereof yieldingly urged axially toward the other pulley half.

4. In a conveyer system, conveyer supporting and driving means including a pair of axially movable pulley halves providing a pulley having a relatively deep groove with rubber-like lining means in the groove thereof, a conveyer conduit, and an endless conveyer having closely spaced flights on said conveyer extending through said conduit and mounted in said pulley groove with the edge portions of the flight on opposite sides thereof in engagement with said lining means whereby a plurality of flights will be in driving contactual engagement with said lining means during a portion of arcuate travel of the conveyer, said pulley having its pulley halves yieldingly urged axially toward each other.

5. In a conveyer system, conveyer supporting and driving means including a pulley having a relatively deep groove with rubber-like lining means in the groove thereof, a conveyer conduit, and an endless conveyer extending through said conduit and mounted in said pulley groove and having closely spaced flights thereon with the marginal edges at opposite points engaging said lining means whereby a plurality of flights will be in driving contactual engagement with said lining means during a portion of arcuate travel of the conveyer.

6. In a conveyer system, conveyer supporting and driving means including a pulley having a relatively deep groove with rubber-like lining means in the groove thereof, a conveyer conduit, and an endless conveyer extending through said conduit and mounted in said pulley groove and having a plurality of closely spaced flights thereon of substantially circular cross-section with the marginal edges on opposite sides engaging said lining means whereby a series of flights will be in contactual driving engagement with opposed portions of said lining means through an arcuate portion of conveyer travel during passage around said pulley.

7. In a conveyer system, conveyer supporting and driving means including a pulley having a relatively deep groove with hollow inflatable rubber-like lining means in the groove thereof and extending along the side thereof, a conveyer conduit, and an endless conveyer, a series of flights on said conveyer in longitudinal closely spaced relation, said conveyer extending through said conduit and mounted in said pulley groove with the edges of said flights at opposite sides thereof engaging said lining means whereby a plurality of flights will be in driving contactual engagement with said lining means during a portion of arcuate travel of the conveyer.

8. A pulley for flexible conveyers having spaced flights comprising shaft means, a pair of pulley disks mounted for independent axial movement on said shaft means, means for yieldingly urging one of said pulley disks toward the other pulley disk, and liner means of rubber-like material secured to the peripheral inner walls of said pulley disks for engagement with the opposite edges of the flights of the conveyer whereby a series of flights will be in contactual driving engagement with the liner means during the arcuate travel of the conveyer about said shaft means.

9. A pulley for flexible conveyers having closely spaced flights comprising shaft means, a pair of pulley disks mounted on said shaft means, said pulley disks having outwardly flared peripheral portions, and liner means of rubber-like material secured to the inner walls of said flared peripheral portions for engagement with the opposite edges of the flights of the conveyer whereby a series of flights will be in contactual driving engagement with the liner means during the arcuate travel of the conveyer about said shaft means.

10. A pulley for flexible conveyers having closely spaced flights thereon comprising shaft means, a pair of axially movable pulley disks mounted on said shaft means, liner means of rubber-like material secured to the peripheral inner walls of said pulley disks for engagement with the opposite edges of said conveyer flights, and an annular flexible member interconnecting the inner edges of said liner means to accommodate movement of the pulley disks on said shaft means.

11. A pulley for flexible conveyers having closely spaced conveyer flights comprising shaft means, a pair of pulley disks mounted on said shaft means, liner means of rubber-like material secured to the perpiheral inner walls of said pulley disks for engagement with the opposite edges of the flights of the conveyer, and an annular flexible member interconnecting the inner edges of said liner means, said annular flexible member having its opposite edges secured adjacent the inner edges of said liner means and having its central portion extending outwardly therefrom to allow relative movement of the pulley disks on the shaft means.

12. A pulley for flexible conveyers having closely spaced conveyer flights, comprising shaft means, a pair of pulley disks mounted on said shaft means, and an annular inflatable hollow liner member of rubber-like material mounted between the peripheral inner walls of said pulley disks in driving engagement with opposed edges of the spaced flights whereby said conveyer will be resiliently driven.

13. A pulley for flexible conveyers having closely spaced conveyer flights comprising shaft means, a pair of pulley disks mounted on said shaft means, an annular inflatable hollow liner member of rubber-like material mounted between the peripheral inner walls of said pulley disks for driving engagement with opposite edges of said flights, and means for yieldingly urging one of said disks toward the other disk whereby variations in conveyer length will be compensated.

14. A pulley for flexible conveyers with closely spaced flights comprising shaft means, a pair of pulley disks mounted on said shaft means and having peripheral flanges extending axially toward each other, and liner means of rubber-like material secured to the peripheral inner walls of said pulley disks with the outer edges covered by said peripheral flanges for contactual driving engagement with the opposite edges of the flights of the conveyer.

HENRY W. HAPMAN.